Jan. 23, 1951 A. C. RUSTAD 2,538,849

MULTIPLE CLUTCH FOR FACSIMILE SCANNING MACHINES

Filed Oct. 30, 1945 4 Sheets-Sheet 1

ARTHUR C. RUSTAD
INVENTOR.

BY John J. Rogan
ATTORNEY

MULTIPLE CLUTCH FOR FACSIMILE SCANNING MACHINES

Filed Oct. 30, 1945

ARTHUR C. RUSTAD
INVENTOR.

BY John J. Rogan
ATTORNEY

Jan. 23, 1951 A. C. RUSTAD 2,538,849

MULTIPLE CLUTCH FOR FACSIMILE SCANNING MACHINES

Filed Oct. 30, 1945 4 Sheets-Sheet 3

ARTHUR C. RUSTAD
INVENTOR.

BY John J. Rogan
ATTORNEY

MULTIPLE CLUTCH FOR FACSIMILE SCANNING MACHINES

Filed Oct. 30, 1945 4 Sheets-Sheet 4

ARTHUR C. RUSTAD
INVENTOR.

BY John J. Rogan
ATTORNEY

Patented Jan. 23, 1951 2,538,849

UNITED STATES PATENT OFFICE 2,538,849

MULTIPLE CLUTCH FOR FACSIMILE SCANNING MACHINES

Arthur C. Rustad, Floral Park, N. Y., assignor to Press Wireless, Inc., New York, N. Y., a corporation of Delaware Application October 30, 1945, Serial No. 625,591

3 Claims. (Cl. 192—48)

This invention relates to facsimile scanning machines and in particular to scanning drum control arrangements in such machines.

In certain fields of facsimile use, it is often necessary to transmit without delay, a series of temperatures or similar subject matter. This usually requires a stopping of the scanning drum, wrapping the sheet or film around the drum, and then fastening it in place on the drum by suitable holders. When a large number of transmissions are to be successively made, since it is necessary to remove each sheet before the next one can be applied, there results a considerable waste of time and may often require holding the electric transmission circuit in a state of idleness while the change is being made.

Accordingly, it is a principal object of this invention to provide a novel drum arrangement and drive control therefor, whereby one sheet or film can be loaded to the scanning drum, while another sheet or film is undergoing the scanning process.

Another object is to provide a scanning drum arrangement whereby the sheets or film of widely different sizes can be scanned.

A feature of the invention relates to a plural-section scanning drum having selectively operable drive controls whereby either section, or both sections, can be rotated for scanning.

Another feature relates to a novel clutch control arrangement for use with a plural-section scanning drum.

A further feature relates to the novel organization, arrangement and relative interconnection of parts which cooperate to provide an improved and efficient facsimile scanning machine.

In the drawing, which shows one preferred embodiment,

Figure 1:
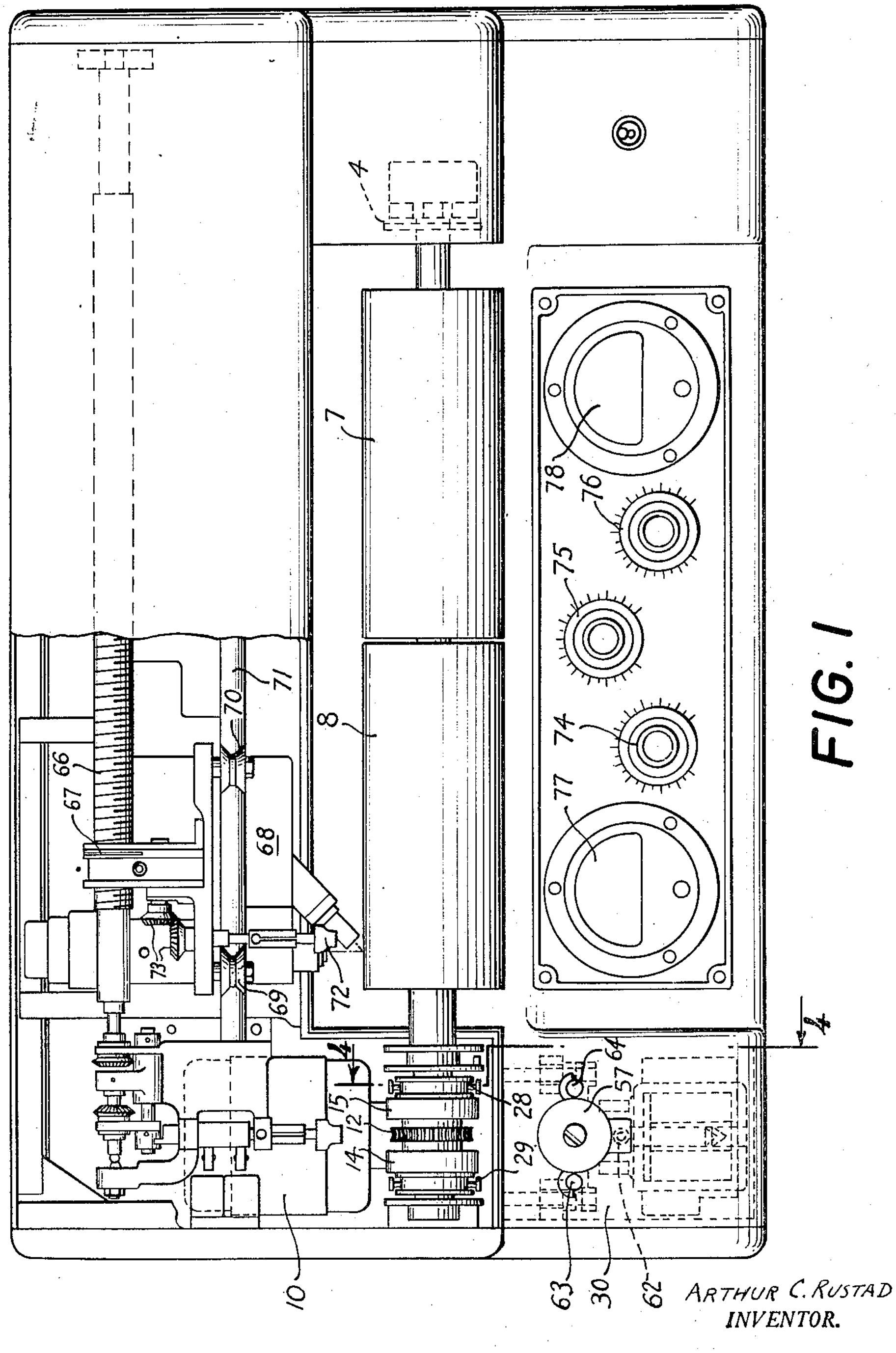
Fig. 1 is a top-plan view, with part of the enclosing casing removed.
Figure 2:
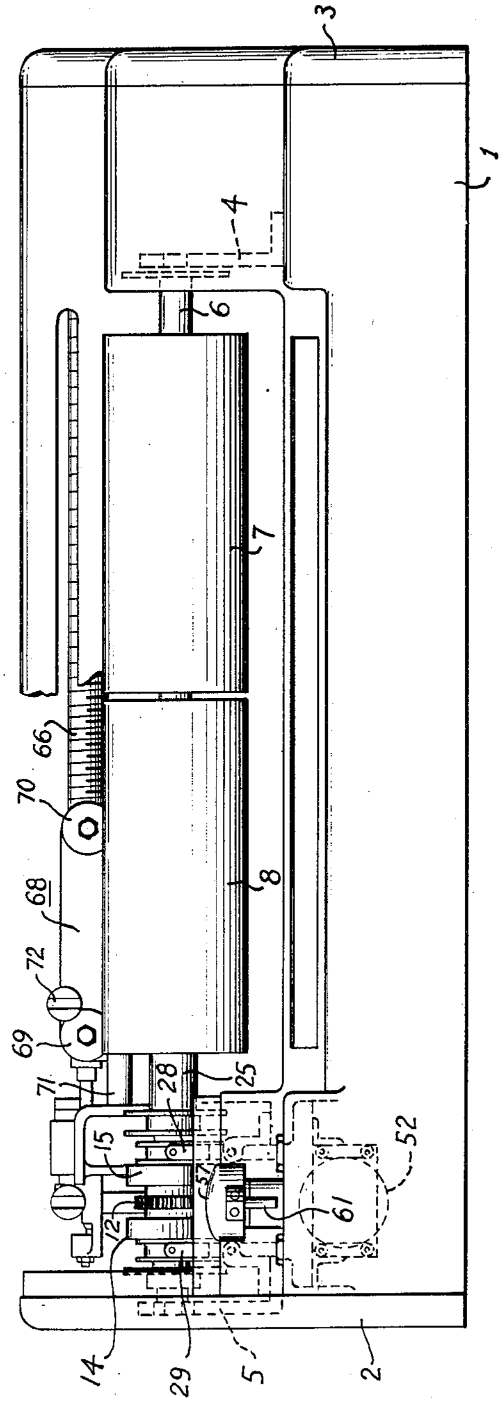
Fig. 2 is a front view of Fig. 1 with the enclosing casing removed to show the drum selective drive arrangement and controls.
Figure 6:
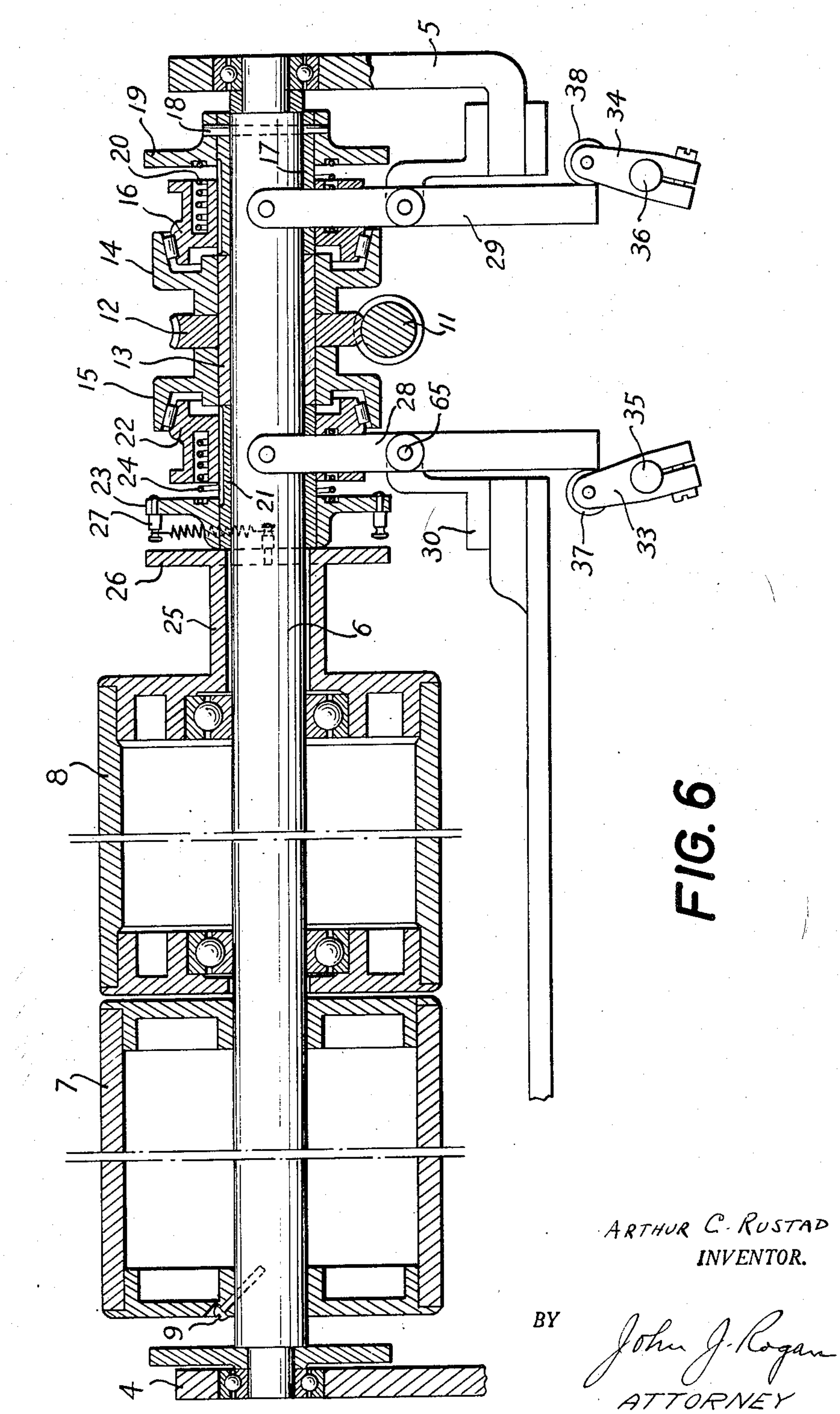
Fig. 6 is an enlarged detailed view of the drum, control shaft and clutch mechanism shown in Figs. 1 to 5.

Referring to Figs. 1, 2 and 6, the facsimile machine comprises a suitable base plate 1, having end walls 2 and 3. Attached to base 1 are bearing brackets 4, 5, in which the reduced ends of the main drum shaft 6 are mounted for rotation. Supported on shaft 6 are the cylindrical scanning drum sections 7, 8. Section 7 is pinned at 9 to shaft 6, so as to rotate as a unit therewith. Section 8 however, is supported on ball bearing races around shaft 6, so that section 8 can be stopped without stopping the rotation of shaft 6. Sections 7 and 8 are of the same outside diameter and are mounted on shaft 6 with a minimum of clearance between the adjacent ends so as to form in effect a single continuous drum surface.

The drum sections are arranged to be driven from motor 10 through a worm 11 and worm-wheel 12, the latter being keyed or otherwise fastened to sleeve 13 (Fig. 6) which is rotatable around shaft 6. Also keyed to sleeve 13 are clutch plates 14 and 15. Cooperating with plate 14 is a shiftable clutch plate 16 which is slidably keyed on a sleeve 17 which in turn is pinned at 18 to shaft 6 and to the abutment collar member 19. A coiled spring 20 is located between members 16 and 19 and normally holds the clutch members 14 and 16 in driving engagement.

Rotatably mounted on shaft 6 is a sleeve 21 to which is slidably keyed the shiftable clutch plate 22 for cooperation with plate 15, and fastened to sleeve 21 is an abutment plate 23. A spring 24 normally holds plates 15 and 22 in driving engagement. The drum section 8 has a collar extension 25 and a flange 26 which is connected to plate 23 by a series of flexible bars 27, so as not to interfere with the proper lining-up of the clutch plates 15 and 22 while at the same time providing a resilient but positive drive connection between member 23 and the drum section 8. Normally therefore, when motor 10 is running, and the clutches are in the clutched position as shown in Fig. 6, both sections 7 and 8 are likewise running in synchronism.

Each of the shiftable clutch members 16, 22, is provided with a bifurcated clutch lever 28, 29, each of which is pivotally mounted on suitable fixed brackets attached to plate 30. Each member 28, 29, has pins 31, 32, each of which rides in the peripheral grooved face of the corresponding member 28, 29. The lower ends of the clutch levers extend downwardly and engage corresponding arms 33, 34, fastened to respective rocker shafts 35, 36. Suitable contact rollers 37, 38, are provided at the end of each arm 33, 34. The lower ends 39 of the clutch levers are held in contact with the associated roller 37 or 38 by leaf springs 40, 41. Also fastened to the rocker arms 35 and 36 at their forward ends are members 42, 43, which carry latch members 44, 45, at their lower ends. Each of the arms 42, 43, is also provided with a roller 46, 47, for purposes to be described.

Figures 3, 3A:
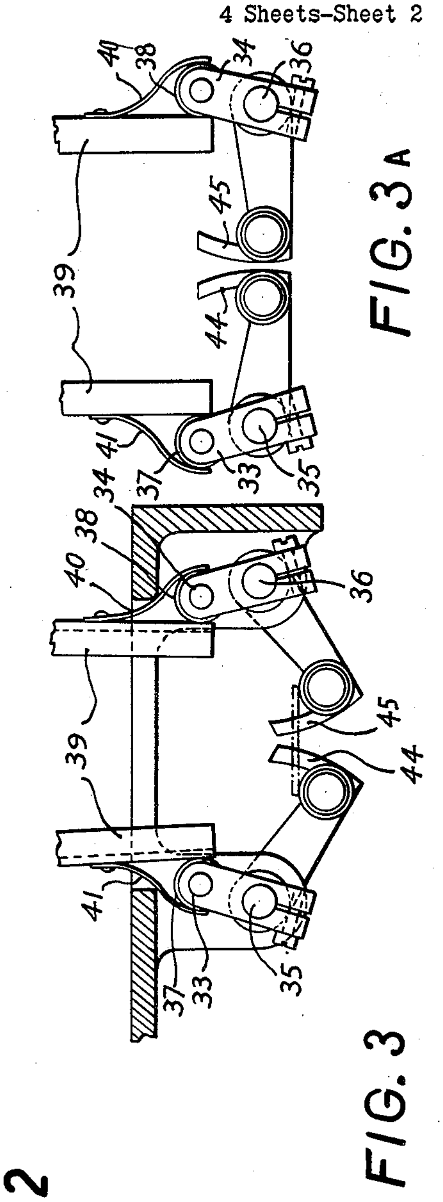
Figure 3 is an enlarged view of part of the clutch control of Figs. 1 and 2 to show it in one selective position.
Fig. 3A is a view similar to Fig. 3 showing the parts in a different selective position.
Figures 4, 5:
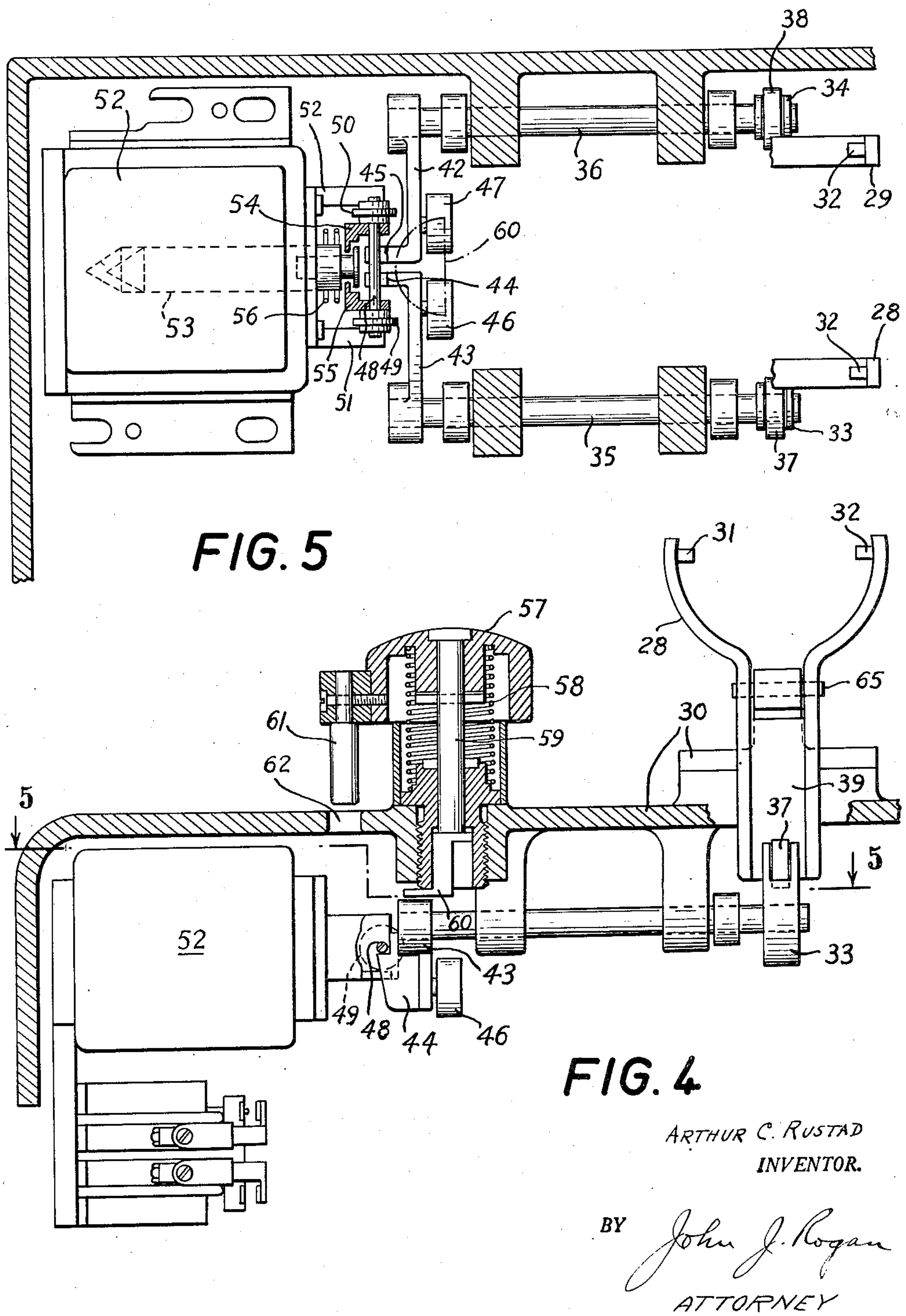
Fig. 4 is an enlarged sectional view of Fig. 1, taken along the line 4—4 thereof.
Fig. 5 is a sectional view of Fig. 4, taken along the line 5—5 thereof.

Fig. 3 shows the position of the shafts 35 and 36, and latch members 44, 45; when both levers 28 and 29 are moved to unclutched position. Fig. 3A shows the parts when both the levers are in the clutched position. When the clutch levers are operated to the unclutched position, the latch members 44, 45, are held in that position (Fig. 3) by a bar 48 which is supported at its ends by rollers 49, 50, on roller guides 51, 52, rigidly fastened to a casting 53, which houses a solenoid 52. Casing 53 is rigidly supported on member 1. The solenoid plunger 53 has a grooved right-hand end (Fig. 5) which engages the lips of members 54 and 55 through which the bar 48 extends. A spring 56 located between members 54, 55, and member 52, normally holds the plunger 53 and the bar 48 in their forward positions as shown in Fig. 5. In this position, bar 48 is vertically above the latch members 44, 45.

Consequently if both these latch members have been depressed, and if the solenoid 52 is de-energized, the levers 28, 29 are positively held in de-clutched position so that neither of the drum sections 7, 8 rotates. This is the position of the drum before any transmissions are made.

For the purpose of operating either of the latches 44, 45, or both of these latches, there is provided a selector button 57 which is normally held in raised position above plate 30 (Fig. 4) by a spring 58. Button 57 has a shank 59 which carries at its lower end a semi-circular flat shoe 60 for acting on one or both of the rollers 46, 47. Button 57 is not only depressible vertically, but is also rotatable around the vertical axis of shank 59 and is arranged to assume 3 different selective positions. These positions are determined by a downwardly depending pin 61 and three cooperating holes 62, 63, 64 in plate 30. Consequently button 57 cannot be depressed until the pin 61 is in alignment with one of these holes.

Assuming for purposes of explanation that the machine is to be started in operation, the motor 10 is connected in circuit and the button 57 is turned so that pin 61 is in alignment with hole 62. In this position of the button, member 60 overlies both rollers 46, 47. Consequently when the button is originally depressed in this position, both latch members 44, 45 are depressed and latch themselves underneath the magnet-controlled bar 48. In this latched condition arms 33, 34 are rotated inwardly towards each other to the position shown in Fig. 3, causing both clutch levers 28, 29 to be rotated around their respective pivots 65 against the force of the associated springs 20, 24 (Fig. 6), thus declutching shaft 6 from the motor. Consequently neither of the drum sections 7, 8 rotates. In this condition the film or sheet to be scanned is loaded on to both drum sections. If it is of a width greater than either drum section it can be wrapped around both drum sections, so as to overlap the spaced ends thereof. Thus both drum sections form in effect a single continuous scanning drum.

It will be observed that motor 10 also drives through suitable gearing, a lead screw 66 which is engaged by any suitable split nut 67 which is rigidly fastened to the scanning head 68 of any well-known construction. Head 68 carries a pair of grooved wheels 69 and 70 which ride on guide rail 71. By this means, the scanning head 68 is moved in a direction parallel to the shaft 6 an elemental distance for each revolution of said shaft. The split nut 67 is adapted to be opened to free the scanning head from the lead screw by means of a cam (not shown), which lies between the arms of the split nut and which cam is adapted to be rotated manually by a knob 72 through the intermediary of suitable bevelled gears 73. When the film or sheet has been loaded on to both sections, it is held in place thereon by any suitable fastening means (not shown) and knob 72 is turned to free the split nut, whereupon the scanning head can be moved to any desired starting point with respect to the film to be scanned. When the various adjustments have been made in the electrical components of the machine as indicated by dials 74, 75, 76 and meters 77, 78, the mechanism is in readiness to receive the starting impulse which is applied to solenoid 52. The latter thereupon operates its plunger 53 to the left (Fig. 5) whereupon bar 48 unlatches members 44 and 45, and allows the clutch members 14 and 15 to engage the corresponding clutch members 16, 22 whereby both drum sections rotate as a unit.

When it is desired to stop both drum sections, button 57 is again depressed causing both clutches to be declutched. In the event that the drum sections are used individually, it may be desirable to allow one section to continue its scanning rotation while the other section is stationary. Thus if the film or sheet to be scanned is narrow enough to be loaded on one drum section, this section can continue its scanning rotation and while it is rotating another film or sheet may be loaded on to the stationary drum section so that the latter is in readiness for scanning upon completion of the scanning of the sheet on the first section. For this purpose the button 57 is rotated so as to bring the pin 61 in alignment either with hole 63 or hole 64 depending upon which drum section is to be stationary. If pin 61 is turned to hole 63 and the button is depressed, the shoe member 60 overlies only the roller 47 and therefore depression of the button causes latching only of the member 45. This results in a rocking only of shaft 36 and therefore a declutching of the member 16 from the member 14. Therefore shaft 6 is stationary as is drum section 7. However clutch members 15 and 22 remain in engagement and therefore drum section 8 continues to rotate. If the button 57 is turned so that pin 61 is aligned with hole 64 and the button depresses, it results in a declutching of members 15 and 22 whereupon drum section 8 stops rotating but section 7 continues to rotate.

While one particular arrangement has been disclosed for controlling the selective rotation of either or both of the drum sections, it will be understood that various changes and modifications may be made therein without departing from the spirit and scope of the invention. It will also be understood that the invention is useful either with a transmitting facsimile scanner or with a receiving facsimile scanner as will be apparent to those familiar with the facsimile art.

What is claimed is:

1. A power control for facsimile machine of the type having a pair of scanning drum sections and a motor for driving said drum sections, said power control comprising a pair of shiftable clutches for coupling said drum sections in driving relation to said motor, an operating member for each of said clutches, a single manually depressible and rotatable selector member for moving either or both said clutch operating members to a normal position wherein said drum sections are declutched from the motor, and an electromagnetic control latching member for both said operating members, the rotary motion of said selector member determining which one or both of said clutch operating members are to be actuated and the depression of said selector member causing said member to be latched with said latching member.

2. A selective power control for a facsimile machine of the type having scanning drum means divided into two separate sections of the same outside diameter and with a motor for driving both drum sections, said power control comprising a pair of clutches each having a shiftable element one for each of said drum sections for coupling said sections to said motor, operating levers for each of said shiftable clutch elements, a common selector device for said operating levers and arranged to be moved to three different positions, means responsive to the operation of said device in one position for operating both said clutch levers, means responsive to the operation of said device in a second position for operating only one of said clutch levers, and means responsive to the operation of said device in a third position for operating only the other of said clutch levers, said common selector device comprising an operating button having a shank which is mounted for reciprocating motion and for rotary motion, said shank having a shoe at one end, an electromagnetic latch arranged to latch with said shoe in response to reciprocating motion of said shank, said shiftable operating levers including a pair of rockable shafts said shafts having rocker arms located adjacent said shoe on opposite sides of the central line of said shank, the reciprocating motion of said shank serving to engage said shoe with said latch and the rotary motion of said shank serving to selectively operate either one or both of said rocker arms and thereby selectively operate said clutch levers.

3. A selective power control for a facsimile machine of the type having scanning drum means divided into two separate sections of the same outside diameter and with a motor for driving both drum sections, said power control comprising a pair of clutches each having a shiftable element one for each of said drum sections for coupling said sections to said motor, operating levers for each of said shiftable clutch elements, a common selector device for said operating levers and arranged to be moved to three different positions, means responsive to the operation of said device in one position for operating both said clutch levers, means responsive to the operation of said device in a second position for operating only one of said clutch levers, means responsive to the operation of said device in a third position for operating only the other of said clutch levers, said common selector device comprising a single operating button having a shank which is mounted for rotation and reciprocation, and said operating means for said shiftable clutch levers includes a pair of rocker arms one for each clutch lever, means responsive to the reciprocating motion of said shank for moving one or both of said rocker arms to control the operation of one or both of said clutch levers, means to lock said rocker arms in operated position after the return of said button and shank to normal, and electromagnetic means for releasing said arms from locked position in response to a received electric signal, the rotary motion of said shank determining which one or both of said rocker arms are operated by said reciprocation of said shank.

ARTHUR C. RUSTAD.

REFERENCES CITED

The following references are of record in the file of this patent:

UNITED STATES PATENTS

| Number | Name | Date |
|---|---|---|
| 367,720 | Mahnken | Aug. 2, 1887 |
| 2,295,572 | Finch | Sept. 15, 1942 |
| 2,371,804 | Cooke | Mar. 20, 1945 |